(12) United States Patent
Matsuno et al.

(10) Patent No.: US 10,346,509 B2
(45) Date of Patent: Jul. 9, 2019

(54) SAMPLING DATA PROCESSING DEVICE, SAMPLING DATA PROCESSING METHOD, AND COMPUTER PROGRAM

(71) Applicant: Murata Manufacturing Co., Ltd., Nagaokakyo-shi, Kyoto-fu (JP)

(72) Inventors: Yuki Matsuno, Nagaokakyo (JP); Teruhisa Tsuru, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 90 days.

(21) Appl. No.: 15/384,732

(22) Filed: Dec. 20, 2016

(65) Prior Publication Data

US 2017/0103043 A1  Apr. 13, 2017

Related U.S. Application Data

(63) Continuation of application No. PCT/JP2015/060501, filed on Apr. 2, 2015.

(30) Foreign Application Priority Data

Jun. 20, 2014 (JP) .................................. 2014-127367

(51) Int. Cl.
 *G06F 17/18* (2006.01)
 *G06Q 50/04* (2012.01)
 *G05B 19/418* (2006.01)

(52) U.S. Cl.
 CPC .......... *G06F 17/18* (2013.01); *G05B 19/418* (2013.01); *G05B 19/41875* (2013.01);
 (Continued)

(58) Field of Classification Search
 CPC ......... G06F 17/18; B07C 5/00; G05B 19/418; G05B 19/41875; G05B 2219/32199; G06Q 50/04; Y02P 90/22; Y02P 90/30
 See application file for complete search history.

(56) References Cited

U.S. PATENT DOCUMENTS 5,825,899 A * 10/1998 Yamaguchi ............ G11B 20/10
                                                            381/94.4
8,214,166 B2    7/2012 Tanaka et al.
(Continued)

FOREIGN PATENT DOCUMENTS

JP        2008-309690 A      12/2008
WO    WO 2010/137488 A1     12/2010

OTHER PUBLICATIONS

International Search Report issued for PCT/JP2015/060501, dated Jun. 2, 2015.

(Continued)

*Primary Examiner* — Bryan Bui
(74) *Attorney, Agent, or Firm* — Arent Fox LLP

(57) ABSTRACT

Upper and lower limits of predetermined characteristic values of products contained in a plurality of product lots are stored in accordance with the product standard for a target product. An average value of standard deviations in the characteristic values is calculated based on a control chart for the product lots. An average value of the characteristic values is calculated, and an upper limit and a lower limit of an average value of the characteristic values in a 95% confidence interval is calculated. A measurement standard deviation representing a variation in a measuring instrument with regard to the characteristic values is estimated. One of an upper limit and a lower limit of the average value of the characteristic values in the confidence interval is updated as an average value of the characteristic values. A standard deviation in the characteristic values of the product is estimated, and an upper defect rate and a lower defect rate are calculated, so that a yield rate is calculated.

6 Claims, 9 Drawing Sheets

(52) U.S. Cl.
CPC ... *G06Q 50/04* (2013.01); *G05B 2219/32199* (2013.01); *Y02P 90/22* (2015.11); *Y02P 90/30* (2015.11)

(56) References Cited

U.S. PATENT DOCUMENTS

| | | | |
|---|---|---|---|
| 9,037,436 B2* | 5/2015 | Tsuru | G06Q 10/00 702/181 |
| 9,061,322 B2* | 6/2015 | Tsuru | B07C 5/00 |
| 2008/0319696 A1 | 12/2008 | Tanaka et al. | |
| 2012/0072174 A1 | 3/2012 | Tsuru | |
| 2012/0095803 A1 | 4/2012 | Tsuru | |
| 2015/0220489 A1 | 8/2015 | Tsuru | |

OTHER PUBLICATIONS

Shao et al., "Design of Sampling Inspection Plants with Screening by Variables," Japan Industrial Management Association, vol. 42(6), 1992, pp. 397-405.

Standard Deviation and Variance, http://www.mathsisfun.com/data/standard-deviation.html, last accessed Nov. 10, 2016, pp. 1-7.

Tsuru, "New Techniques and Methods for Managing Measurement Risk," NCSLI Measure J. Meas. Sci., vol. 10(3), Sep. 2015, pp. 72-75.

Written Opinion of the International Searching Authority issued for International Patent Application No. PCT/JP2015/060501, dated Jun. 2, 2015.

* cited by examiner

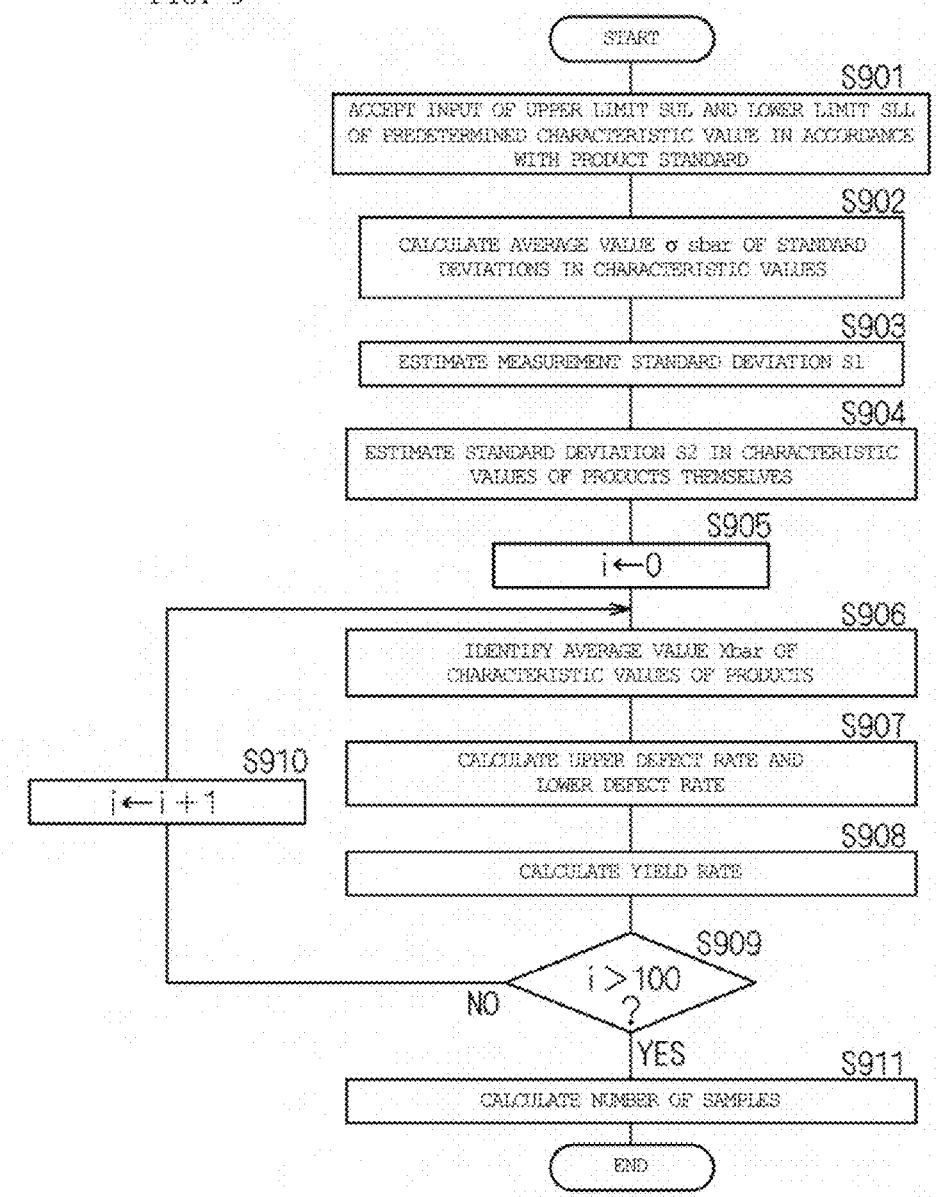

SAMPLING DATA PROCESSING DEVICE, SAMPLING DATA PROCESSING METHOD, AND COMPUTER PROGRAM

CROSS REFERENCE TO RELATED APPLICATION

The present application is a continuation of International application No. PCT/JP2015/060501, filed Apr. 2, 2015, which claims priority to Japanese Patent Application No. 2014-127367, filed Jun. 20, 2014, the entire contents of which is incorporated herein by reference.

TECHNICAL FIELD

The present invention relates to a sampling data processing device, a sampling data processing method, and a computer program for estimating, based on data of samples taken from product lots, the number of product lots outside a product standard.

BACKGROUND ART

Before shipping, products are each measured for a characteristic value representing a predetermined characteristic, and are sorted into non-defective and defective products depending on whether or not a predetermined standard is satisfied. Each product is sorted by comparison of a measured characteristic value of the product with an inspection standard of which conditions are more rigorous than conditions of a product standard (a characteristic value required for the product). If the variation in the measured characteristic values of the products is only the variation in the characteristic values of the products themselves, the products can be correctly sorted into non-defective and defective products even if the conditions of the inspection standard are defined to be the same as those of the product standard.

The variation in the measured characteristic values of the products is, however, not only the variation in the characteristic values of the products themselves, but also includes the variation in values measured by a measuring system. Therefore, products sorted as non-defective products may include defective products, while products sorted as defective products may include non-defective products.

Further, it is difficult to screen all products, and accordingly, only a certain number of products are usually sampled for inspection. In such sampling inspection, the cost for the inspection is reduced as the average number of products to be inspected is smaller.

One known method for doing so is set forth in "Design of Sampling Inspection Plans with Screening by Variables: Sampling Inspection Plans with Screening for Normal Distribution," Communication of JIMA, Vol. 42, No. 6 (1992), p. 397-405. In this method it is assumed that a quality characteristic is distributed according to a "normal distribution" to assure that a lot acceptance probability in a lot tolerance defect rate is a specified value or less, this publication discloses a method for significantly reducing an average inspection quantity as compared with a sampling inspection plan designated in the product standard.

The method disclosed in this publication presupposes that the product quality characteristic is distributed according to a "normal distribution," and thus, the accuracy of the OC curve is enhanced by utilizing the characteristic of the "normal distribution." The method is basically identical to a conventional method for estimating an OC curve, which does not specifically estimate the distribution of product lots. Therefore, there arises a problem that the sufficient estimation accuracy is difficult to be assured.

In view of the foregoing, the present invention aims to provide a sampling data processing device, a sampling data processing method and a computer program for estimating with high accuracy the number of product lots outside the product standard based on data of samples taken from the product lots, by concretely estimating a distribution of the product lots using data of a control chart.

SUMMARY OF THE INVENTION

To achieve the above-described object, a sampling data processing device according to the present invention for estimating, based on data of samples taken from product lots of a target product, a number of the product lots outside a product standard includes: a standard range accepting unit for accepting input of an upper limit and a lower limit of predetermined characteristic values in accordance with the product standard for the target product; a standard deviation calculating unit for calculating an average value of standard deviations in the characteristic values based on a control chart for the product lots; a sample average calculating unit for calculating an average value of the characteristic values based on data acquired by measuring a predetermined number of samples taken from the product lots; a confidence interval calculating unit for calculating an upper limit and a lower limit of an average value of the characteristic values in a 95% confidence interval based on the calculated average value of the standard deviations in the characteristic values and the average value of the characteristic values; a measurement standard deviation calculating unit for estimating a measurement standard deviation representing a variation in a measuring instrument with regard to the characteristic values; an average value updating unit for determining which one of the input upper limit and lower limit of the characteristic values is closer to the calculated average value of the characteristic values, and updating one of the upper limit and lower limit of the average value of the characteristic values in the confidence interval, which corresponds to the limit determined to be closer, as an average value of the characteristic values; a product standard deviation estimating unit for estimating a standard deviation in the characteristic values of the product based on the average value of the standard deviations in the characteristic values and the measurement standard deviation; a defect rate calculating unit for calculating an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and a yield rate calculating unit for calculating a yield rate based on the calculated upper defect rate and lower defect rate.

Next, to achieve the above-described object, a sampling data processing device according to the present invention for estimating, based on data of samples taken from product lots of a target product, a number of the product lots outside a product standard includes: a standard range accepting unit for accepting input of an upper limit and a lower limit of predetermined characteristic values in accordance with the product standard for the target product; a standard deviation calculating unit for calculating an average value of standard deviations in the characteristic values based on a control chart for the product lots; a measurement standard deviation calculating unit for estimating a measurement standard deviation representing a variation in a measuring instrument with regard to the characteristic values; a product standard deviation estimating unit for estimating a standard deviation in the characteristic values of the product based on the average value of the standard deviations in the characteristic values and the measurement standard deviation; an average identifying unit for sequentially identifying an average value of the characteristic values between the input upper limit and lower limit of the characteristic values; a defect rate calculating unit for sequentially calculating, per the identified average value of the characteristic values, an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and a yield rate calculating unit for sequentially calculating a yield rate based on the calculated upper defect rate and lower defect rate, in which an interval of average values of the characteristic values, in which the calculated yield rate is equal to or above a predetermined threshold value, is sequentially identified, and then a corresponding number of samples to be taken is calculated.

Next, to achieve the above-described object, a sampling data processing method, according to the present invention, executable by a sampling data processing device for estimating, based on data of samples taken from product lots of a target product, a number of the product lots outside a product standard includes the steps of: accepting input of an upper limit and a lower limit of predetermined characteristic values in accordance with the product standard for the target product; calculating an average value of standard deviations in the characteristic values based on a control chart for the product lots; calculating an average value of the characteristic values based on data acquired by measuring a predetermined number of samples taken from the product lots; calculating an upper limit and a lower limit of an average value of the characteristic values in a 95% confidence interval based on the calculated average value of the standard deviations in the characteristic values and the average value of the characteristic values; estimating a measurement standard deviation representing a variation in a measuring instrument with regard to the characteristic values; determining which one of the input upper limit and lower limit of the characteristic values is closer to the calculated average value of the characteristic values, and updating one of the upper limit and lower limit of the average value of the characteristic values in the confidence interval, which corresponds to the limit determined to be closer, as an average value of the characteristic values; estimating a standard deviation in the characteristic values of the product based on the average value of the standard deviations in the characteristic values and the measurement standard deviation; calculating an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and calculating a yield rate based on the calculated upper defect rate and lower defect rate.

Next, to achieve the above-described object, a sampling data processing method, according to the present invention, executable by a sampling data processing device for estimating, based on data of samples taken from product lots of a target product, a number of the product lots outside a product standard includes the steps of: accepting input of an upper limit and a lower limit of predetermined characteristic values in accordance with the product standard for the target product; calculating an average value of standard deviations in the characteristic values based on a control chart for the product lots; estimating a measurement standard deviation representing a variation in a measuring instrument with regard to the characteristic values; estimating a standard deviation in the characteristic values of the product based on the average value of the standard deviations in the characteristic values and the measurement standard deviation; sequentially identifying an average value of the characteristic values between the input upper limit and lower limit of the characteristic values; sequentially calculating, per the identified average value of the characteristic values, an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and sequentially calculating a yield rate based on the calculated upper defect rate and lower defect rate, in which an interval of average values of the characteristic values, in which the calculated yield rate is equal to or above a predetermined threshold value, is sequentially identified, and then a corresponding number of samples to be taken is calculated.

Next, to achieve the above-described object, a computer program, according to the present invention, executable by a sampling data processing device for estimating, based on data of samples taken from product lots of a target product, a number of the product lots outside a product standard, the computer program causes the sampling data processing device to function as: a standard range accepting unit for accepting input of an upper limit and a lower limit of predetermined characteristic values in accordance with the product standard for the target product; a standard deviation calculating unit for calculating an average value of standard deviations in the characteristic values based on a control chart for the product lots; a sample average calculating unit for calculating an average value of the characteristic values based on data acquired by measuring a predetermined number of samples taken from the product lots; a confidence interval calculating unit for calculating an upper limit and a lower limit of an average value of the characteristic values in a 95% confidence interval based on the calculated average value of the standard deviations in the characteristic values and the average value of the characteristic values; a measurement standard deviation calculating unit for estimating a measurement standard deviation representing a variation in a measuring instrument with regard to the characteristic values; an average value updating unit for determining which one of the input upper limit and lower limit of the characteristic values is closer to the calculated average value of the characteristic values, and updating one of the upper limit and lower limit of the average value of the characteristic values in the confidence interval, which corresponds to the limit determined to be closer, as an average value of the characteristic values; a product standard deviation estimating unit for estimating a standard deviation in the characteristic values of the product based on the average value of the standard deviations in the characteristic values and the measurement standard deviation; a defect rate calculating unit for calculating an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and a yield rate calculating unit for calculating a yield rate based on the calculated upper defect rate and lower defect rate.

Next, to achieve the above-described object, a computer program, according to the present invention, executable by a sampling data processing device for estimating, based on data of samples taken from product lots of a target product, a number of the product lots outside a product standard, the computer program causes the sampling data processing device to function as: a standard range accepting unit for accepting input of an upper limit and a lower limit of predetermined characteristic values in accordance with the product standard for the target product; a standard deviation calculating unit for calculating an average value of standard deviations in the characteristic values based on a control chart for the product lots; a measurement standard deviation calculating unit for estimating a measurement standard deviation representing a variation in a measuring instrument with regard to the characteristic values; a product standard deviation estimating unit for estimating a standard deviation in the characteristic values of the product based on the average value of the standard deviations in the characteristic values and the measurement standard deviation; an average identifying unit for sequentially identifying an average value of the characteristic values between the input upper limit and lower limit of the characteristic values; a defect rate calculating unit for sequentially calculating, per the identified average value of the characteristic values, an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; a yield rate calculating unit for sequentially calculating a yield rate based on the calculated upper defect rate and lower defect rate; and a unit for sequentially calculating a corresponding number of samples to be taken by identifying an interval of average values of the characteristic values, in which the calculated yield rate is equal to or above a predetermined threshold value.

With the above-described configuration, the sampling data processing device, the sampling data processing method and the computer program according to the present invention can estimate with high accuracy the number of product lots outside the product standard based on data of samples taken from product lots. In contrast, by estimating the distribution of a yield rate, the number of samples to be taken for achieving a predetermined yield rate, for example, 99.99% or higher, can be calculated backward.

BRIEF EXPLANATION OF DRAWINGS

FIGS. 8(a) and 8(b) show graphs illustrating in an enlarged manner two regions shown in FIG. 7.

FIG. 9 is a flowchart of a procedure performed by a CPU in an arithmetic processing section of the sampling data processing device according to the second embodiment of the present invention.

MODE FOR CARRYING OUT THE INVENTION

Hereinafter, a specific description will be given of a sampling data processing device for estimating the number of product lots outside a product standard based on data of samples taken from product lots according to embodiments of the present invention. The embodiments described below do not limit the present invention described in the claims, and all combinations of characteristic features described in the embodiments are not always indispensable.

While a sampling data processing device in which a computer program is introduced in a computer system will be described in the following embodiments, the present invention can also be implemented partially or wholly in hardware such as a sampling data processing device. Any combination of software and hardware can be used. A computer program can be recorded in a computer-readable recording medium such as a hard disk, a DVD, a CD, an optical storage device, or a magnetic storage device.

(First Embodiment)

Figure 1:
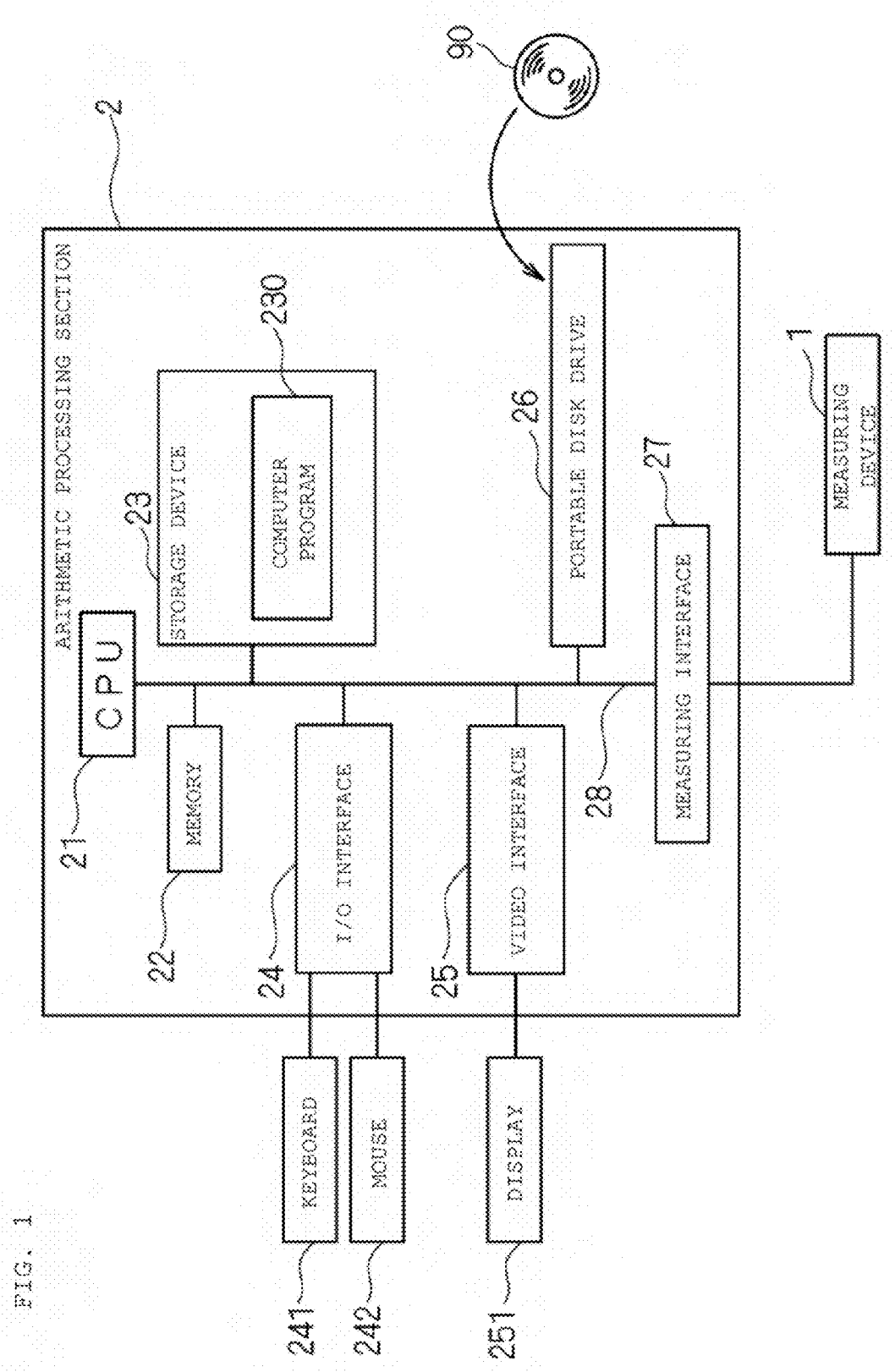
FIG. 1 is a block diagram illustrating an exemplary configuration of a sampling data processing device according to a first embodiment of the present invention.

FIG. 1 is a block diagram illustrating an exemplary configuration of a sampling data processing device according to a first embodiment of the present invention. The sampling data processing device according to the first embodiment includes a measuring device 1 for measuring a characteristic value representing a predetermined characteristic of a product, and an arithmetic processing section 2 for processing the measured characteristic value.

The measuring device 1 measures a characteristic value representing a predetermined characteristic of a product. For example, when the product is a ceramic capacitor, the measuring device 1 measures a capacitance, i.e., a characteristic value of the product. An exemplary hardware configuration of the measuring device 1 for measuring a capacitance is an LCR meter.

The arithmetic processing section 2 is preferably configured to include at least a central processing unit (CPU) 21, a memory 22, a storage device 23, an I/O interface 24, a video interface 25, a portable disk drive 26, a measuring interface 27, and an internal bus 28 for connecting the above-described hardware.

The CPU 21 is connected, via the internal bus 28, to each hardware element as described above of the arithmetic processing section 2 to control an operation of each hardware and to execute various software functions according to a computer program 230 stored in the storage device 23. The memory 22 is preferably configured to include a volatile memory such as SRAM and SDRAM. A load module is decompressed when the computer program 230 is executed, and the memory 22 stores temporary data generated when the computer program 230 is executed.

The storage device 23 is preferably configured to include a built-in fixed storage device (hard disk), a ROM, and/or other devices. The computer program 230 stored in the storage device 23 is preferably downloaded from a portable recording medium 90, such as DVD and CD-ROM in which information including the program and data is recorded, by the portable disk drive 26. When the computer program 230 is executed, the computer program 230 is decompressed from the storage device 23 to the memory 22 for execution. The computer program may also be downloaded from an external computer connected to a network.

The measuring interface 27 is connected to the internal bus 28 and communicates with the measuring device 1 so that a measured characteristic value, a control signal, and other data can be exchanged between the measuring device 1 and the arithmetic processing section 2. The I/O interface 24 is connected to data entry devices such as keyboard 241 and mouse 242 to accept an input of data. The video interface 25 is connected to a display 251 such as CRT monitor and LCD to display a predetermined image.

Figure 2:
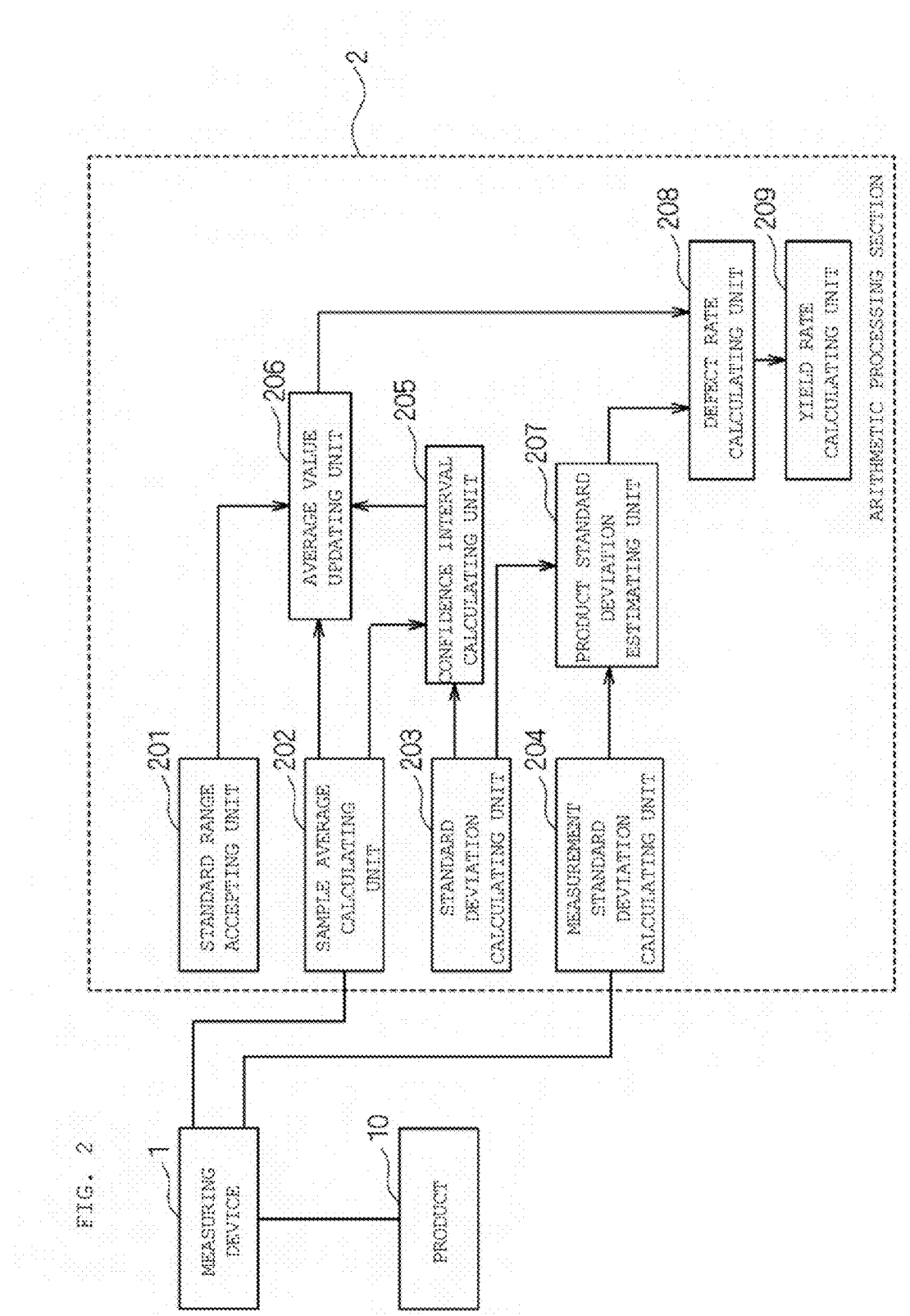
FIG. 2 is a functional block diagram of the sampling data processing device according to the first embodiment of the present invention.

Hereinafter, a description will be given of an operation of the sampling data processing device configured as described above. FIG. 2 is a functional block diagram of the sampling data processing device according to the first embodiment of the present invention. The measuring device 1 measures a characteristic value (e.g., capacitance) representing a predetermined characteristic of a product 10.

A standard range accepting unit 201 accepts input of upper and lower limits of predetermined characteristic values in accordance with a product standard for a target product. For example, when as a characteristic value, product lots are assumed to include 10,000 capacitors each having a capacitance of 2.5 pF, an upper limit product standard (upper limit: SUL) for the capacitors is, by way of example, 2.64 pF, and a lower limit product standard (lower limit: SLL) is, by way of example, 2.44 pF. A user enters the upper and lower limits of the predetermined characteristic value of the product via the keyboard 241 or the like and those limits are stored in an appropriate memory (e.g., storage device 23). Such values may also be stored in the storage device 23 in advance via a communication network (not shown).

Based on data acquired by measuring a predetermined number of samples taken from each of the product lots (e.g., ten samples per lot), a sample average calculating unit 202 calculates an average value of the characteristic values. For example, ten products are taken from each of the product lots as samples, and the capacitance of each sample is measured by the measuring device (LCR meter) 1. An average value of the measured characteristic values is individually calculated for each lot, and for example, an average value Xbar (2.5388 pF) of the characteristic values for each lot is stored in memory 22 or any other suitable memory.

A standard deviation calculating unit 203 calculates an average value of standard deviations in the characteristic values for each lot. This information is used to create a control chart such as that shown in FIG. 3.

Figure 3:
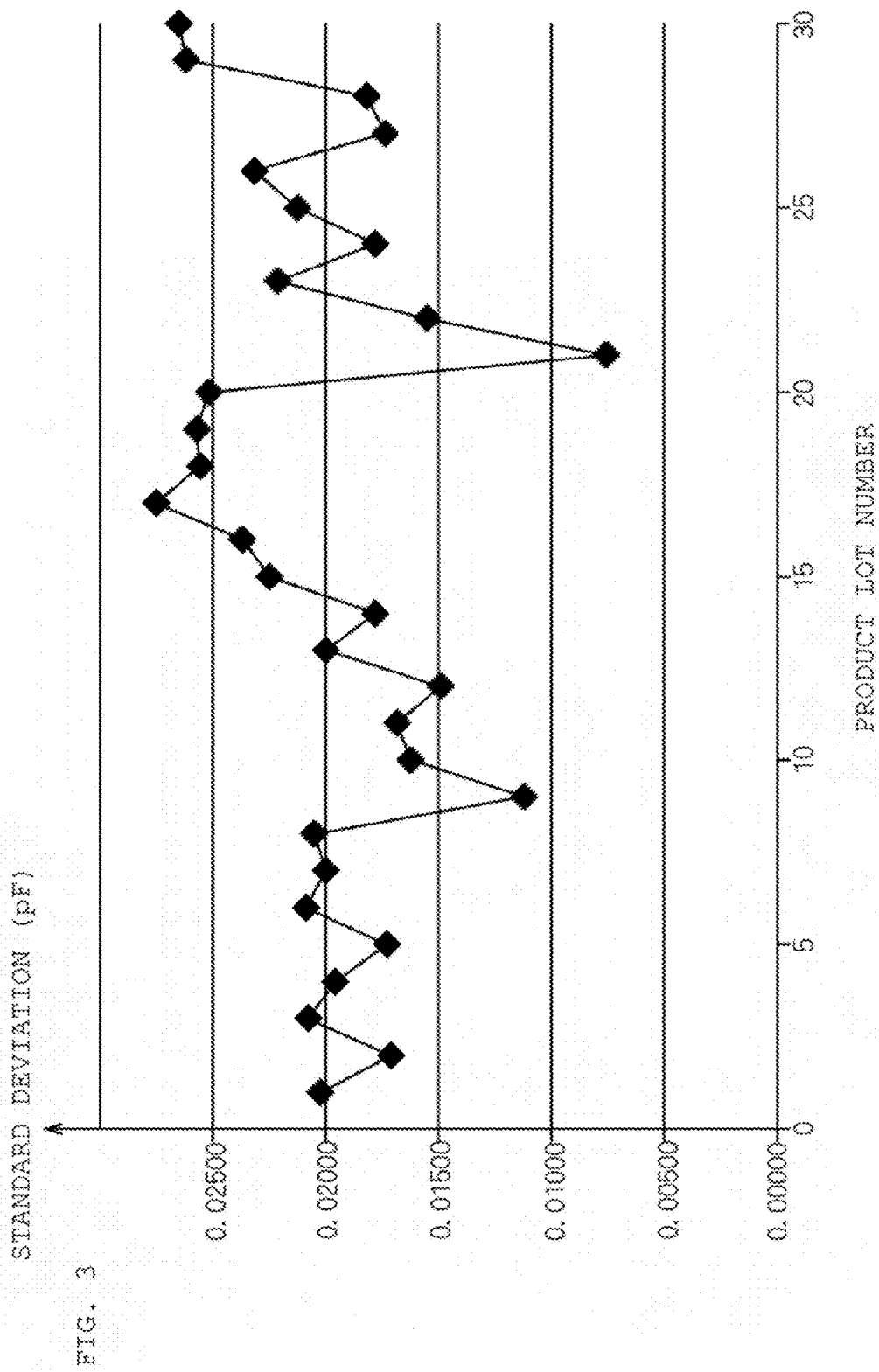
FIG. 3 is a view illustrating a control chart for product lots as one example.

As shown in FIG. 3, standard deviations (pF) in 30 product lots are respectively plotted. An average value of the standard deviations in the 30 lots, for example, can be thus calculated. The result value is 0.020531 pF. The value is regarded as an average value σsbar (pF) of the standard deviations in the characteristic values of all of the lots.

Returning to FIG. 2, based on the stored average value Xbar (2.5388 pF) of the measured characteristic values and the calculated average value σsbar (0.020531 pF) of the standard deviations in the characteristic values of the 30 lots, a confidence interval calculating unit 205 calculates upper and lower limits of an average value of the characteristic values of the samples from all of the lots with a 95% confidence interval. Specifically, the upper and lower limits of the average value of the characteristic values with the 95% confidence interval are calculated according to the following Formula 1 and Formula 2, respectively.

$$Xbar + 2 \cdot \frac{1}{C4} \cdot \frac{\sigma_s bar}{\sqrt{n}} \quad \text{(Formula 1)}$$

$$Xbar - 2 \cdot \frac{1}{C4} \cdot \frac{\sigma_s bar}{\sqrt{n}} \quad \text{(Formula 2)}$$

The control chart coefficient C4 for Formula 1 and Formula 2 is calculated according to Formula 3.

$$C4 = \sqrt{\frac{2}{n-1}} \frac{\Gamma\left(\frac{n}{2}\right)}{\Gamma\left(\frac{n-1}{2}\right)} \quad \text{(Formula 3)}$$

When, for example, the number of samples per lot n is 10 it is substituted into Formula 3 and a control chart coefficient C4=0.97266 is obtained. This value is substituted in Formula 1 and Formula 2, and accordingly the upper and lower limits of the average value of the characteristic values in the confidence interval are respectively 2.552150 pF and 2.525450 pF.

Next, a measurement standard deviation calculating unit 204 estimates a measurement standard deviation S1 in the characteristic values, which represents a variation in the measuring device 1 itself as to the characteristic values. Specifically, by using a standard deviation σEV in data acquired by measuring characteristic values of the product 10 ten times without changing any conditions, the measurement standard deviation S1 is calculated according to Formula 4.

$$S1 = \frac{\sigma_{EV}}{C4} \quad \text{(Formula 4)}$$

In this formula, C4 is the result of Formula 3. Assuming that the number of repeated measurements n is 10, the standard deviation S1 will be 0.002242 pF.

An average value updating unit 206 determines which of the upper limit SUL and the lower limit SLL is closer to the average value Xbar and then updates the upper limit SUL or the lower limit SLL to which is closer, as an the average value Xbar. For example, the sample average calculating unit 202 extracts ten products from the product lot as samples. Since the average value Xbar is 2.5388 pF, a difference between the average value Xbar and the upper limit SUL and a difference between the average value Xbar and the lower limit SLL are calculated (Formula 5).

$$Xbar - SLL = 2.5388 - 2.44 = 0.0988 (\text{pF})$$
$$SUL - Xbar = 2.64 - 2.5388 = 0.1012 (\text{pF})$$
(Formula 5)

Since the average value Xbar is closer to the lower limit SLL, the lower limit of 2.525450 pF of the average value of the characteristic values in the 95% confidence interval, is updated as the average value Xbar of the characteristic values.

Based on the average value $\sigma_s bar$ of the standard deviations in the characteristic values and the measurement standard deviation S1, a product standard deviation estimating unit 207 estimates a standard deviation S2 in the characteristic values of the products themselves. First, a standard deviation TV in the characteristic values, which represents a total variation, is calculated according to Formula 6.

$$TV = B4 \times \sigma_s^{bar}/C4$$ (Formula 6)

Note that, $$B4 = 1 + \frac{3}{C4}\sqrt{1-(C4)^2}$$

Based on the number of samples n=30 used to obtain the standard deviation for each product lot, control chart coefficients B4 and C4 in Formula 6 are respectively calculated as B4=1.39558 and C4=0.99142. These values are substituted in Formula 6 to obtain TV=0.0289008 pF.

The standard deviation S2 in the characteristic values of the products themselves can be calculated in accordance with Formula 7.

$$S2 = \sqrt{TV^2 - S1^2}$$ (Formula 7)

Using this formula, the standard deviation S2=0.0288137 pF is obtained.

The average value Xbar of the characteristic values of the products, the standard deviation S2 in the characteristic values of the products themselves, and the upper limit SUL and the lower limit SLL of the characteristic value of the product are thus determined. Accordingly, a lower defect rate (that is a rate of defective products each having a characteristic value below the lower limit SLL), and an upper defect rate (that is a rate of defective products each having a characteristic value above the upper limit SUL) can be calculated. A defect rate calculating unit 208 calculates an upper defect rate value above the predetermined upper limit of the characteristic value in accordance with the product standard for the target product, and a lower defect rate that is a rate of defective products each having a characteristic value below the predetermined lower limit of the characteristic value in accordance with the product standard for the target product.

Figure 4:
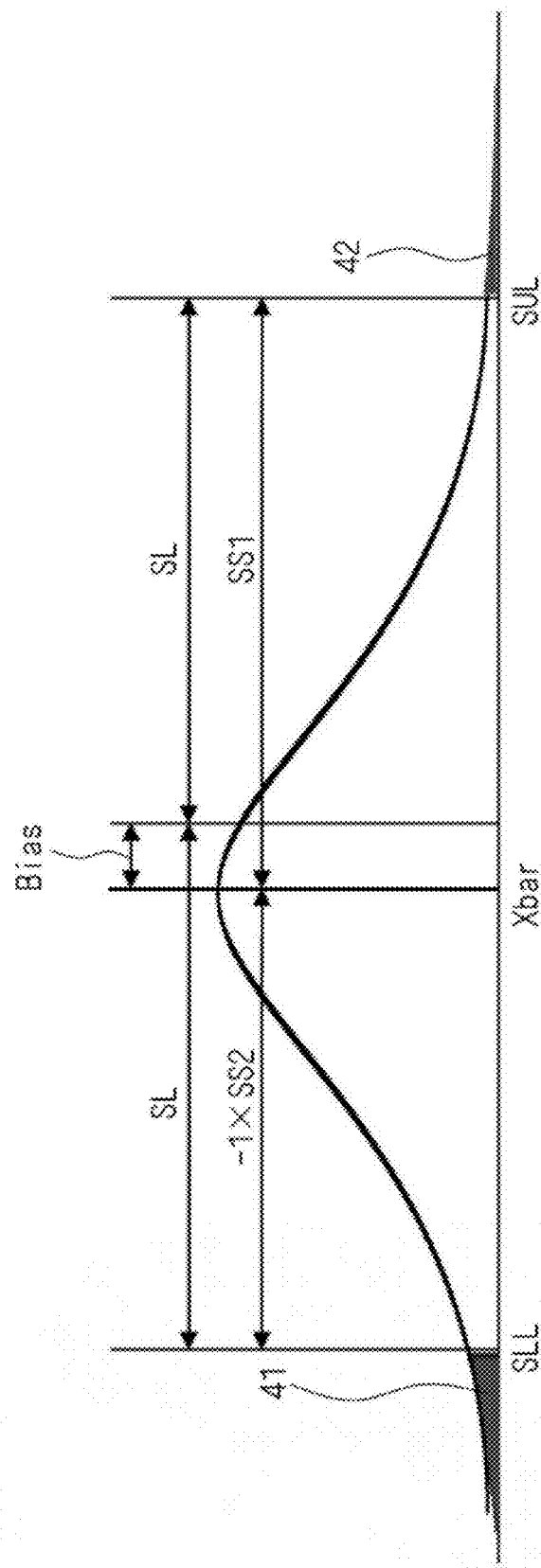
FIG. 4 is a schematic diagram illustrating an upper defect rate and a lower defect rate in the sampling data processing device according to the first embodiment of the present invention.

FIG. 4 is a schematic diagram illustrating an upper defect rate and a lower defect rate in the sampling data processing device according to the first embodiment of the present invention. First, the values SL and Bias are calculated. SL is a value acquired by standardizing a distance from a standard center value of a characteristic value determined from the product standard to one of the upper and lower limits. The Bias is a value acquired by standardizing a distance from an average value of the characteristic values in a product distribution to the standard center value.

The SL value is calculated according to Formula 8, and the Bias value is calculated according to Formula 9.

$$SL = \frac{\frac{SUL-SLL}{2}}{S2}$$ (Formula 8)

$$Bias = \frac{Xbar - \frac{SUL+SLL}{2}}{S2}$$ (Formula 9)

In Formula 8, the standard deviation S2 in the characteristic values of the products themselves=0.0288137, the upper limit SUL of the characteristic value of the product=2.64, and the lower limit SLL=2.44. Accordingly, SL is 3.47058. In Formula 9, the average value Xbar of the characteristic values of the products=2.525450, the standard deviation S2 in the characteristic values of the products themselves=0.0288137, the upper limit SUL of the characteristic value of the product=2.64, and the lower limit SLL=2.44. Accordingly, the Bias value is −0.50497.

As shown in FIG. 4, SL and Bias can be used to calculate a probability that a characteristic value is equal to or below the upper limit SUL of the predetermined characteristic value in accordance with the product standard for the target product, and a probability that a characteristic value is equal to or below the lower limit SLL of the predetermined characteristic value in accordance with the product standard for the target product.

In other words, a value of a cumulative distribution function in a normal distribution, where an average is 0 and a standard deviation is 1, is calculated using a standard density function f(z) in the normal distribution. The standard density function f(z) can be represented by Formula 10.

$$f(z) = \frac{1}{\sqrt{2\pi}} e^{-\frac{z^2}{2}}$$ (Formula 10)

First, computing elements SS1 and SS2 are calculated using the values SL and Bias. Specifically, the computing elements SS1 and SS2 are calculated according to Formula 11.

$$SS1 = SL - \text{Bias}$$
$$SS2 = -1 \times (SL + \text{Bias})$$
(Formula 11)

Using the calculated computing elements SS1 and SS2 as arguments, a probability PU that a characteristic value is below the upper limit SUL, and a probability PL that the characteristic value is below the lower limit SLL can be determined from the standard density function f(z) shown in Formula 10. Accordingly, an upper defect rate 42 (the rate of defective products each having a characteristic value above the upper limit SUL) can be obtained from (1-PU), while a lower defect rate 41 (the rate of defective products each having a characteristic value below the lower limit SLL) is the probability PL itself.

Since SL is 3.47058 and Bias is −0.50497 in the above example, SS1=3.9755 and SS2=−2.96561 are obtained. Thus, the upper defect rate 42 is 0.000035 and the lower defect rate 41 is 0.00151.

Returning to FIG. 2, a yield rate calculating unit 209 calculates a yield rate based on the calculated upper defect rate 42 and the lower defect rate 41. Specifically, the yield rate is calculated from (1−(upper defect rate+lower defect rate)) and is 0.998455. A yield rate of '1' means that the yield rate is 100%.

Therefore, a yield rate can be estimated with high accuracy based on data of samples taken from product lots, and thus the number of product lots outside the product standard can be estimated with high accuracy.

Figure 5:
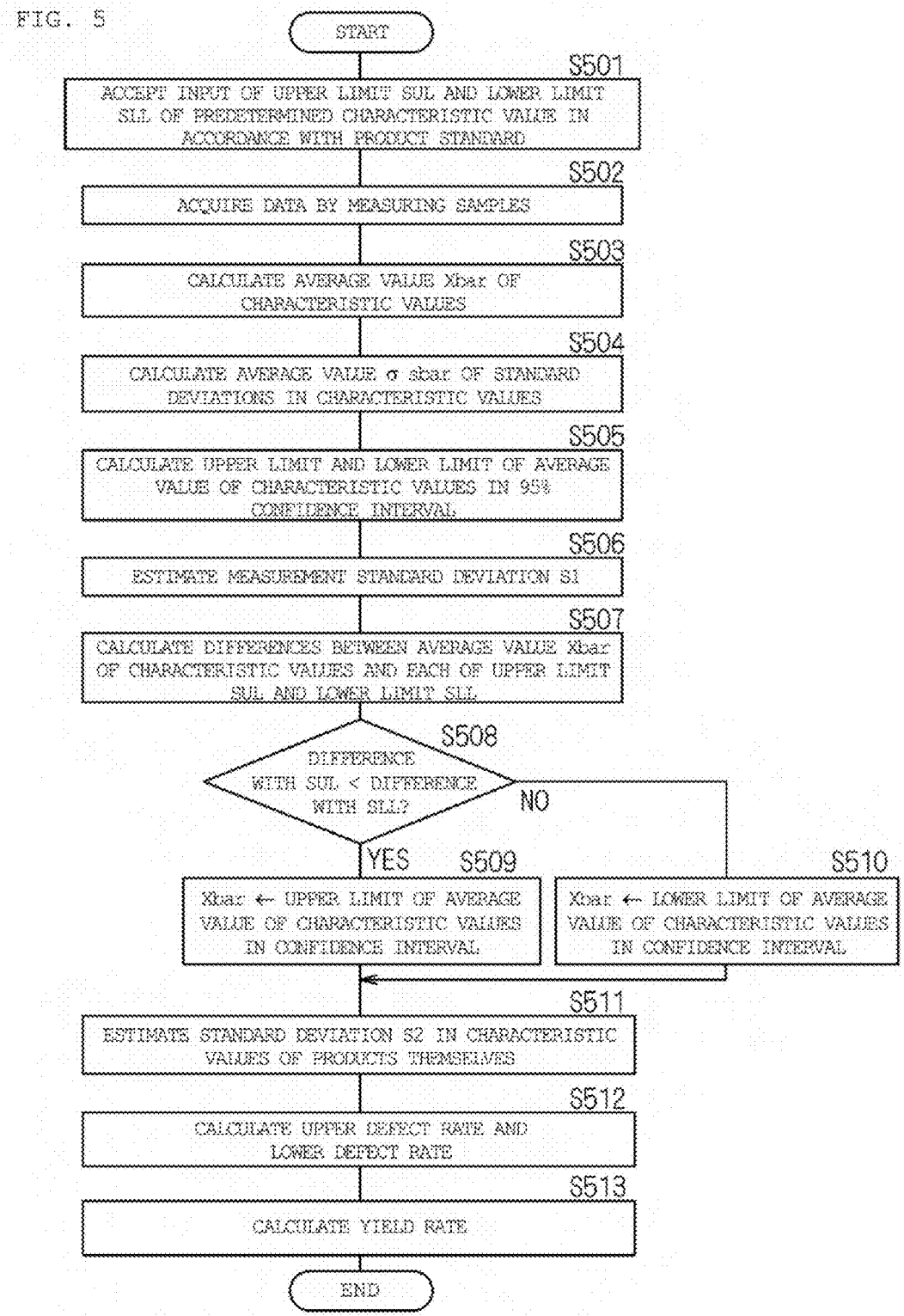
FIG. 5 is a flowchart of a procedure performed by a CPU in an arithmetic processing section of the sampling data processing device according to the first embodiment of the present invention.

FIG. 5 is a flowchart of a procedure performed by the CPU 21 in the arithmetic processing section 2 of the sampling data processing device according to the first embodiment of the present invention. In FIG. 5, the CPU 21 in the arithmetic processing section 2 accepts an input of the upper and lower limits of predetermined characteristic values in accordance with the product standard for the target product (Step S501).

The CPU 21 acquires data by measuring a predetermined number of samples taken from product lots (Step S502), and calculates an average value Xbar of characteristic values (Step S503). Based on a control chart for the product lots, the CPU 21 calculates an average value σsbar of standard deviations in the characteristic values (Step S504).

Based on the stored average value Xbar of the characteristic values and the calculated average value σsbar of the standard deviations in the characteristic values, the CPU 21 calculates upper and lower limits for an average value of the characteristic values in a 95% confidence interval (Step S505). The CPU 21 estimates a measurement standard deviation S1 representing a variation in the measuring device 1 itself with regard to the characteristic values (Step S506).

The CPU 21 calculates differences between the calculated and then stored average value Xbar of the characteristic values and each of the input upper limit SUL and lower limit SLL of the predetermined characteristic value (Step S507), and determines whether or not a difference between the average value Xbar of the characteristic values and the upper limit SUL is smaller than a difference with the lower limit SLL (Step S508). When the CPU 21 determines that the difference between the average value Xbar of the characteristic values and the upper limit SUL is smaller than the difference with the lower limit SLL (Step S508: YES), the CPU 21 updates the upper limit of the average value of the characteristic values in the confidence interval as the average value Xbar of the characteristic values (Step S509). When the CPU 21 determines that the difference between the average value Xbar of the characteristic values and the upper limit SUL is greater than the difference with the lower limit SLL (Step S508: NO), the CPU 21 updates the lower limit of the average value of the characteristic values in the confidence interval as the average value Xbar of the characteristic values (Step S510).

Based on the average value σsbar of the standard deviations in the characteristic values and the measurement standard deviation S1, the CPU 21 estimates a standard deviation S2 in the characteristic values of the products themselves (Step S511). The CPU 21 calculates an upper defect rate and a lower defect rate (Step S512), and calculates a yield rate based on the calculated upper and lower defect rates (Step S513).

According to the first embodiment as described above, with use of a control limit of the control chart, a distribution of product lots is specifically estimated, and the worst yield rate can be estimated with high accuracy based on data of samples taken from product lots. Thus, the number of product lots outside the product standard can be estimated with high accuracy.

(Second Embodiment)

Since the configuration of a sampling data processing device in a second embodiment of the present invention is substantially the same as that in the first embodiment of the present invention, identical reference numerals are applied and a detailed description is omitted. The second embodiment differs from the first embodiment in that the minimum number of samples required to obtain a predetermined yield rate is calculated.

Figure 6:
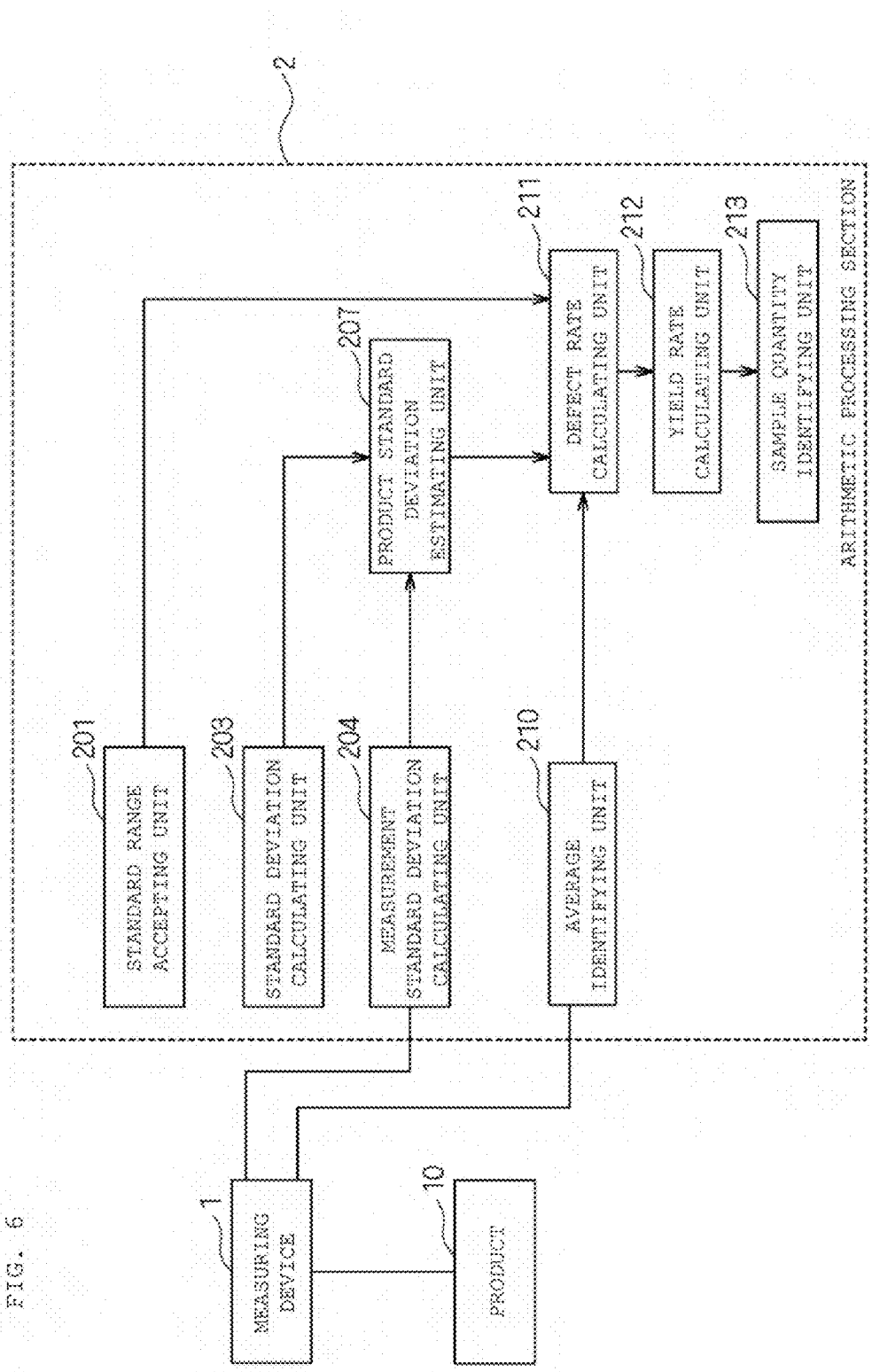
FIG. 6 is a functional block diagram of a sampling data processing device according to a second embodiment of the present invention.

FIG. 6 is a functional block diagram of the sampling data processing device according to the second embodiment of the present invention. The measuring device 1 measures a characteristic value representing a predetermined characteristic of a product 10.

A standard range accepting unit 201 accepts input of upper and lower limits of the predetermined characteristic values in accordance with the product standard for the target product. By way of example, a product lot which includes 10,000 capacitors can have a capacitance of 2.5 pF as a characteristic value. In such a case, an upper limit product standard (upper limit: SUL) for the capacitors can be 2.75 pF, and a lower limit product standard (lower limit: SLL) can be 2.26 pF. A user inputs these upper and lower limits via the keyboard 241 or the like. Such values may also be stored in the storage device 23 in advance via a communication network (not shown).

Based on a control chart for the product lots, a standard deviation calculating unit 203 calculates an average value of standard deviations in the characteristic values for each lot. Similarly to the first embodiment, an average value of the standard deviations in the characteristic values of 30 lots is calculated. The result value is 0.020531 pF. The value is regarded as an average value σsbar (pF) of the standard deviations in all the characteristic values.

A measurement standard deviation calculating unit 204 estimates a measurement standard deviation S1 in the characteristic values, which represents a variation in the measuring device 1 itself as to the characteristic values. Specifically, by using a standard deviation σEV in data acquired by measuring characteristic values of the product 10 ten times without changing any conditions, and the measurement standard deviation S1 in the characteristic values is calculated according to Formula 12. For example, S1=0.002242 pF is obtained.

$$S1 = \frac{\sigma_{EV}}{C4} \qquad \text{(Formula 12)}$$

Based on the average value σsbar of the standard deviations in the characteristic values and the measurement standard deviation S1 in the characteristic values, a product standard deviation estimating unit 207 estimates a standard deviation S2 in the characteristic values of the products themselves. First, a standard deviation TV in the characteristic values, which represents a total variation, is calculated according to Formula 13.

$$TV = B4 \times \sigma_s^{bar}/C4 \qquad \text{(Formula 13)}$$

Note that, $$B4 = 1 + \frac{3}{C4}\sqrt{1-(C4)^2}$$

Based on the number of samples n=30 used to obtain the standard deviation for each product lot, control chart coefficients B4 and C4 in Formula 13 are respectively calculated as B4=1.39558 and C4=0.99142. These values are substituted in Formula 13 to obtain TV=0.0289008 pF.

The standard deviation S2 in the characteristic values of the products themselves can be calculated in accordance with Formula 14. Using this formula, the standard deviation S2=0.0288137 pF is thus obtained.

$$S2 = \sqrt{TV^2 - S1^2} \quad \text{(Formula 14)}$$

Between the upper and lower limits of the characteristic value (which are input at the standard range accepting unit 201), an average identifying unit 210 sequentially identifies an average value of the characteristic values. Specifically, the average identifying unit 210 sequentially increments a variable i by '1' in the range from 0 to 100, and calculates an average value Xbar of the characteristic values of the products according to Formula 15, so as to identify the calculated value as the average value of the characteristic values.

$$Xbar = SLL + \frac{SUL - SLL}{100} \times i \quad \text{(Formula 15)}$$

In Formula 15, for example, when variable i=0, Xbar=SLL=2.26 pF is obtained. For each average value Xbar of the characteristic value, which is identified while the variable i is sequentially changed, a defect rate calculating unit 211 sequentially calculates an upper defect rate (that is a rate of defective products each having a characteristic value above the upper limit of the characteristic value in accordance with the product standard for the target product,) and a lower defect rate (that is a rate of defective products each having a characteristic value below the lower limit of the characteristic value in accordance with the product standard for the target product).

Similarly to the first embodiment, an SL value is calculated according to Formula 16, and a Bias value is calculated according to Formula 17.

$$SL = \frac{\frac{SUL - SLL}{2}}{S2} \quad \text{(Formula 16)}$$

$$Bias = \frac{Xbar - \frac{SUL + SLL}{2}}{S2} \quad \text{(Formula 17)}$$

Computing elements SS1 and SS2 are then calculated using the SL value and the Bias value according to Formula 18.

$$\left. \begin{array}{l} SS1 = SL - Bias \\ SS2 = -1 \times (SL + Bias) \end{array} \right\} \quad \text{(Formula 18)}$$

Using the calculated computing elements SS1 and SS2 as arguments, a probability PU that a characteristic value is below the upper limit SUL, and a probability PL that the characteristic value is below the lower limit SLL can be determined from the standard density function f(z) shown in Formula 10. Similarly to the first embodiment, in FIG. 4, an upper defect rate 42 (the rate of defective products each having a characteristic value above the upper limit SUL) can therefore be obtained from (1-PU), while a lower defect rate 41 (the rate of defective products each having a characteristic value below the lower limit SLL) is the probability PL itself. When the variable i=0, the upper defect rate 42 is 0.0 and the lower defect rate 41 is 0.5.

Returning to FIG. 6, a yield rate calculating unit 212 sequentially calculates a yield rate based on the calculated upper defect rate 42 and the lower defect rate 41. Specifically, the yield rate can be calculated from (1-(upper defect rate+lower defect rate)). All yield rates are calculated while the variable i is changed in the range from 0 to 100.

Figure 7:
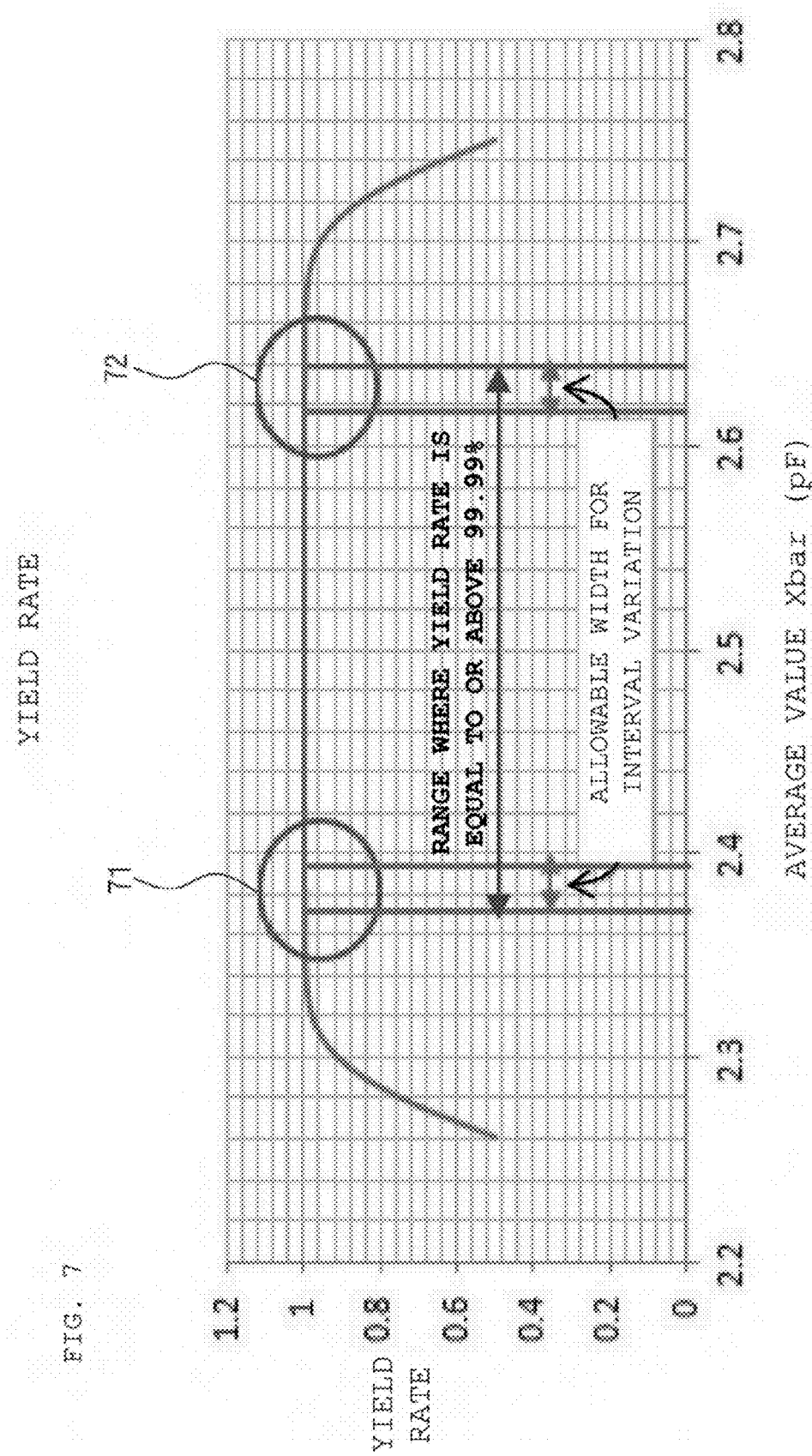
FIG. 7 is a graph illustrating a variation in yield rates when a variable i is changed in the range from 0 to 100.
Figure 6A:
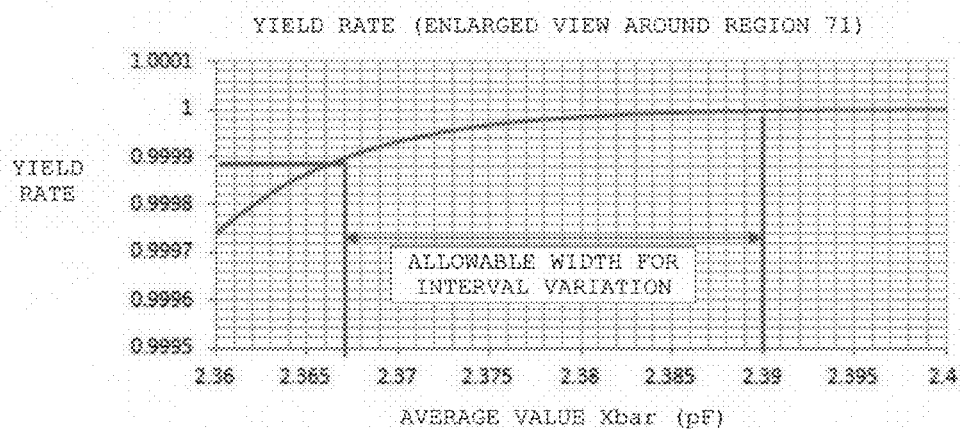
Figure 6B:
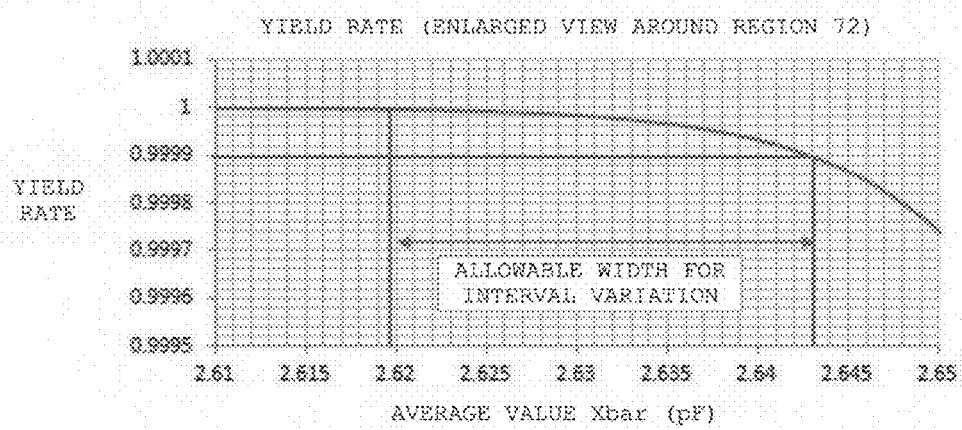

A sample quantity identifying unit 213 sequentially identifies an interval of average values of the characteristic values, where the calculated yield rate is a predetermined threshold value or more, to calculate a corresponding number of samples to be extracted. FIG. 7 is a graph illustrating a variation in yield rates when the variable i is changed in the range from 0 to 100. In FIG. 7, the vertical axis represents the yield rate while the horizontal axis represents an average value Xbar of characteristic values ranging from a lower limit SLL to an upper limit SUL. In FIG. 7, for example, the yield rate of '1' means that the yield rate is 100%.

FIGS. 8(a) and 8(b) are graphs illustrating, in an enlarged manner, two regions, i.e., a region 71 and a region 72, shown in FIG. 7. For example, when an interval of average values Xbar of characteristic values, where the yield rate is equal to or above 99.99%, is acquired, the length of the interval is 0.2744 pF because the interval with the yield rate of 99.99% ranges from 2.3678 pF to 2.6422 pF with reference to FIG. 8(a) and FIG. 8(b). An allowable width for interval variation is provided above and under this interval.

As is apparent from FIG. 7, FIG. 8(a), and FIG. 8(b), two allowable widths for interval variation are provided within the interval where the yield rate is equal to or above 99.99%. In the second embodiment, an allowable width for interval variation is provided as 0.015 pF. When the average value σsbar of 0.020531 pF of standard deviations in the characteristic values of all the products, which is calculated at the standard deviation calculating unit 203, is used, Formula 19 is satisfied.

Allowable Width for Interval Variation $$= 2 \times \frac{1}{C4} \times \frac{\sigma_s bar}{\sqrt{n}} \quad \text{(Formula 19)}$$

$$\text{Note that, } C4 = \sqrt{\frac{2}{n-1}} \frac{\Gamma\left(\frac{n}{2}\right)}{\Gamma\left(\frac{n-1}{2}\right)}$$

By backward calculating Formula 19, the number of samples to be extracted is n=13.3. This is rounded up to n=14.

FIG. 9 is a flowchart of a procedure performed by a CPU 21 in an arithmetic processing section 2 of the sampling data processing device according to the second embodiment of the present invention. In FIG. 9, the CPU 21 in the arithmetic processing section 2 accepts input of the upper and lower limits for predetermined characteristic values in accordance with the product standard for the target product (Step S901).

Based on a control chart for the product lots, the CPU 21 calculates an average value σsbar of standard deviations in the characteristic values (Step S902). The CPU 21 estimates a measurement standard deviation S1 representing a variation in the measuring device 1 itself with regard to the characteristic values (Step S903).

Based on the average value σsbar of the standard deviations in the characteristic values and the measurement standard deviation S1 in the characteristic values, the CPU 21 estimates a standard deviation S2 in the characteristic values of the products themselves (Step S904). The variable i is set to '0' (Step S905), and, between the input upper limit SUL and lower limit SLL of the predetermined characteristic values, the CPU 21 sequentially identifies an average value Xbar of the characteristic values (Step S906).

The CPU 21 sequentially calculates an upper defect rate and a lower defect rate for each identified average value of the characteristic values (Step S907), and sequentially calculates a yield rate based on the calculated upper and lower defect rates (Step S908). Specifically, the yield rate can be calculated with (1−(upper defect rate+lower defect rate)).

The CPU 21 determines whether or not the variable i exceeds '100' (Step S909). When the CPU 21 determines that the variable i does not exceed '100' (Step S909: NO), the CPU 21 increments the variable i by '1' (Step S910), causes a process to return to the Step S906, and repeats the above-described process. When the CPU 21 determines that the variable i exceeds '100' (Step S909: YES), the CPU 21 calculates the number of samples to be extracted n (Step S911).

According to the second embodiment as described above, the distribution of product lots is specifically estimated using data of the control chart, and the distribution of yield rates is estimated. Thus, the number of samples to be extracted for achieving a predetermined yield rate, for example, a yield rate of 99.99% or more, can be backward calculated.

The present invention is not limited to the above-described examples, but can be changed or modified in various manners without departing from the spirit and scope of the present invention. For example, a distribution of products is estimated as a normal distribution in the above-described first and second embodiments. However, it is apparent that the present invention can be applied even if the distribution of products is a distribution other than the normal distribution.

The invention claimed is:

1. A sampling data processing device for estimating a number of the product lots which fall outside a product standard based on measured characteristic values of sample products taken from each of a plurality of product lots of a target product, the sampling data processing device comprising:
 a memory for storing upper and lower limits of the characteristic values of the products in accordance with the product standard for the target product;
 means for calculating a yield rate by:
   calculating an average value of standard deviations in measured characteristic values of a plurality of products from each of the product lot based on a control chart for the plurality of product lots;
   calculating an average value of the measured characteristic values;
   calculating an upper limit and a lower limit of an average value of the characteristic values in a 95% confidence interval based on the calculated average value of the standard deviations in the characteristic values and the average value of the characteristic values;
   estimating a measurement standard deviation representing a variation in a measuring instrument with regard to the characteristic values;
   determining which one of the stored upper limit and lower limit of the characteristic values is closer to the calculated average value of the characteristic values, and updating one of the upper limit and lower limit of the average value of the characteristic values in the confidence interval which corresponds to the limit determined to be closer to the average value of the characteristic values;
   estimating a standard deviation in the characteristic values of the product based on the average value of the standard deviations in the characteristic values and the measurement standard deviation;
   calculating an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and
   calculating the yield rate based on the calculated upper and lower defect rates.

2. A sampling data processing device for estimating a number of the product lots which fall outside a product standard based on measured characteristic values of sample products taken from each of a plurality of product lots of a target product, the sampling data processing device comprising:
 a memory for storing upper and lower limits of the characteristic values of the products in accordance with the product standard for the target product;
 means for calculating a number of samples to be measured by:
   calculating an average value of standard deviations in measured characteristic values of a plurality of product lots from each of the product lot based on a control chart for the plurality of product lots;
   estimating a measurement standard deviation representing a variation in a measuring instrument with regard to the characteristic values;
   estimating a standard deviation in the characteristic values of the product based on the average value of the standard deviations in the characteristic values and the measurement standard deviation;
   calculating an average value of the characteristic values between the stored upper and lower limits of the characteristic values;
   calculating, as a function of the identified average value of the characteristic values, an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product;
   calculating the yield rate based on the calculated upper defect rate and lower defect rate, and
   calculating a corresponding number of samples to be measured by identifying an interval of average values of the characteristic values in which the calculated yield rate is equal to or above a predetermined threshold value.

3. A sampling data processing method for estimating a number of the product lots which fall outside a product standard based on measured characteristic values of sample products taken from each of a plurality of product lots of a target product, the sampling data processing method comprising the steps of:
- storing upper and lower limits of the characteristic values of the products in accordance with the product standard for the target product;
- calculating an average value of standard deviations in measured characteristic values of a plurality of products from each of the product lot based on a control chart for the plurality of product lots;
- calculating an average value of the measured characteristic values;
- calculating an upper limit and a lower limit of an average value of the characteristic values in a 95% confidence interval based on the calculated average value of the standard deviations in the characteristic values and the average value of the characteristic values;
- estimating a measurement standard deviation representing a variation in a measuring instrument with regard to the characteristic values;
- determining which one of the stored upper limit and lower limit of the characteristic values is closer to the calculated average value of the characteristic values, and updating one of the upper limit and lower limit of the average value of the characteristic values in the confidence interval which corresponds to the limit determined to be closer to the average value of the characteristic values;
- estimating a standard deviation in the characteristic values of the product based on the average value of the standard deviations in the characteristic values and the measurement standard deviation;
- calculating an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and
- calculating a yield rate based on the calculated upper and lower defect rates.

4. A sampling data processing method a number of the product lots which fall outside a product standard based on measured characteristic values of sample products taken from each of a plurality of product lots of a target product, the sampling data processing method comprising the steps of:
- storing upper and lower limits of the characteristic values of the product in accordance with the product standard for the target products;
- calculating an average value of standard deviations in measured characteristic values of a plurality of products from each of the product lot based on a control chart for the plurality of product lots;
- estimating a measurement standard deviation representing a variation in a measuring instrument with regard to the characteristic values;
- estimating a standard deviation in the characteristic values of the product based on the average value of the standard deviations in the characteristic values and the measurement standard deviation;
- calculating an average value of the characteristic values between the stored upper and lower limits of the characteristic values;
- calculating, as a function of the identified average value of the characteristic values, an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product;
- calculating a yield rate based on the calculated upper defect rate and lower defect rate, and
- calculating a corresponding number of samples to be measured by identifying an interval of average values of the characteristic values in which the calculated yield rate is equal to or above a predetermined threshold value.

5. A non-transitory computer readable medium encoded with a computer program which, when run on one or more processors, causes the one or more processors to estimate a number of the product lots which fall outside a product standard based on measured characteristic values of sample products taken from each of a plurality of product lots of a target product by:
- storing upper and lower limits of the characteristic values of the products in accordance with the product standard for the target product;
- calculating an average value of standard deviations in measured characteristic values of a plurality of products from each of the product lot based on a control chart for the plurality of product lots;
- calculating an average value of the measured characteristic values;
- calculating an upper limit and a lower limit of an average value of the characteristic values in a 95% confidence interval based on the calculated average value of the standard deviations in the characteristic values and the average value of the characteristic values;
- estimating a measurement standard deviation representing a variation in a measuring instrument with regard to the characteristic values;
- determining which one of the stored upper limit and lower limit of the characteristic values is closer to the calculated average value of the characteristic values, and updating one of the upper limit and lower limit of the average value of the characteristic values in the confidence interval which corresponds to the limit determined to be closer to the average value of the characteristic values;
- estimating a standard deviation in the characteristic values of the product based on the average value of the standard deviations in the characteristic values and the measurement standard deviation;
- calculating an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product; and
- calculating a yield rate based on the calculated upper and lower defect rates.

6. A non-transitory computer readable medium encoded with a computer program which, when run on one or more processors, causes the one or more processors to estimate a number of the product lots which fall outside a product standard based on measured characteristic values of sample products taken from each of a plurality of product lots of a target product by:

storing upper and lower limits of the characteristic values of the products in accordance with the product standard for the target product;

calculating an average value of standard deviations in measured characteristic values of a plurality of products from each of the product lot based on a control chart for the plurality of product lots;

estimating a measurement standard deviation representing a variation in a measuring instrument with regard to the characteristic values;

estimating a standard deviation in the characteristic values of the product based on the average value of the standard deviations in the characteristic values and the measurement standard deviation;

calculating an average value of the characteristic values between the stored upper -and lower limits of the characteristic values;

calculating, as a function of the identified average value of the characteristic values, an upper defect rate that is a rate of defective products each having a characteristic value above the upper limit of the predetermined characteristic values in accordance with the product standard for the target product, and a lower defect rate that is a rate of defective products each having a characteristic value below the lower limit of the predetermined characteristic values in accordance with the product standard for the target product;

calculating a yield rate based on the calculated upper and lower defect rates; and calculating a corresponding number of samples to be measured by identifying an interval of average values of the characteristic values in which the calculated yield rate is equal to or above a predetermined threshold value.

\* \* \* \* \*